United States Patent [19]

Peacock

[11] Patent Number: 4,544,123

[45] Date of Patent: Oct. 1, 1985

[54] FOLDABLE EASEL

[76] Inventor: Peter R. Peacock, 2129 Royall Dr., Winston-Salem, N.C. 27106

[21] Appl. No.: 611,178

[22] Filed: May 17, 1984

[51] Int. Cl.⁴ .............................................. A47B 97/08
[52] U.S. Cl. ................................... 248/460; 248/461; 248/462; 428/12; 206/45.24
[58] Field of Search .................. 428/12; 248/460, 461, 248/462, 459; 40/155, 124.1; 206/45.2, 45.21, 45.22, 44.24, 45.23

[56] References Cited

U.S. PATENT DOCUMENTS

| | | | |
|---|---|---|---|
| 489,518 | 1/1893 | Ambruster | 248/461 |
| 1,180,057 | 4/1916 | McNamara | 248/462 |
| 1,208,622 | 12/1916 | Muller | 248/461 |
| 2,784,929 | 3/1957 | Diening | 248/35 |
| 3,119,194 | 1/1964 | Ray | 45/57 |
| 3,938,772 | 2/1976 | Andrusiak | 248/461 |
| 4,213,520 | 7/1980 | Sarna et al. | 206/45.23 |
| 4,467,541 | 8/1984 | Pettersson | 40/158 B |

FOREIGN PATENT DOCUMENTS 672300  5/1952  United Kingdom ................ 52/14

*Primary Examiner*—John E. Kittle
*Assistant Examiner*—Thomas C. Saitta

*Attorney, Agent, or Firm*—Shefte Pinckney & Sawyer

[57] ABSTRACT

A foldable easel for supporting sheet material includes three sheet members pivoted end to end for selective movement between a folded condition with the members in stacked parallel relation and an erected condition with the members in triangular relation. The free end of one of the two outer members has a lip for supporting the sheet material to rest against the upstanding sheet member in the erected condition. In one embodiment, a mating pin-and-hole connecting system is provided at the free ends of the outer members and at the ends of the intermediate member for permitting releasable connection of the members in either their erected or folded conditions. In another embodiment, one of the outer members has a perimetric border within which the other members are contained in the folded condition and which acts as the lip for engagement therewith of the other outer sheet member when in the erected condition. The outer sheet member which is upstanding in the erected condition may be provided with pivoted side portions for expanding the available surface area for use as a photographic slide projection screen or for additional sheet material support. Holes are provided along the side of at least one of the sheet members for receipt of the easel in a ringed binder.

9 Claims, 7 Drawing Figures

FOLDABLE EASEL

BACKGROUND OF THE INVENTION

The present invention relates to easels and similar devices for holding books, paper, film and other sheet material in an upright disposition for reading or similar uses.

Easels of varying constructions and uses are well known and, for many years, have been a virtually necessary piece of equipment for typists and other operators of similar equipment for supporting books, paper, etc., so as to free the operator's hands for use of his equipment and other tasks. More recently, with the advent and proliferated use of computers, easels have become widely used in such industry by computer operators. While such easels are substantially functional for their intended purposes, they typically are not adapted for ready disassembly, compact storage or transportability, which features are particularly desirable for easels to be used in computer applications.

In contrast, the present invention provides a foldable easel adapted to be folded into a flat condition for ready storage in a notebook, binder or the like for easy transportation or to be unfolded into a functional erected condition.

SUMMARY OF THE INVENTION

Briefly described, the foldable easel of the present invention comprises a planar intermediate sheet member and two planar outer sheet members. An appropriate hinge or similar arrangement pivotably connects respective ends of the two outer sheet members to opposite ends of the intermediate sheet member for selective pivotal movement between a folded condition wherein the intermediate and outer sheet members are disposed in stacked parallel relation with the outer sheet members at opposite sides of the intermediate sheet member and an erected condition wherein the intermediate and outer sheet members are oriented in triangular relation to one another with the free ends of the outer sheet members disposed adjacent one another. The easel may thereby be operatively disposed in the erected condition with one of the outer sheet members horizontal and the other outer sheet member and the intermediate sheet member upstanding convergingly therefrom. A lip member is provided at the free end of one of the outer sheet members for disposition outwardly adjacent the upstanding outer sheet member in the erected condition for supporting and retaining books, sheet material and the like for resting against the upstanding outer sheet member when the intermediate and the outer sheet members are in the described operative disposition.

Preferably, the intermediate and outer sheet members are rectangular in shape and are formed of a rigid plastic material. One of the intermediate and outer sheet members has an extension portion along one side edge thereof and has plural openings formed in the extension portion to facilitate receipt of the easel in a ringed binder or the like.

In one embodiment of the easel, a connecting arrangement is provided at the free ends of the outer sheet members for releasably retaining them in the erected condition. Preferably, the connecting arrangement includes a plurality of openings formed in either the lip member or the horizontal outer sheet member and a plurality of mating pins formed on the other thereof for receipt in the openings in the erected condition. The lip member is pivotably connected to the free end of the upstanding outer sheet member for selective pivotal movement to extend coplanarly with the upstanding outer sheet member in the folded condition and to lie on the horizontal outer sheet member at its free end in parallel relation therewith in the erected condition for mated connection of their respective openings and pins. A supplemental connecting arrangement of pins and openings is provided at the ends of the intermediate sheet member for cooperative mating engagement with the pins and openings of the first-mentioned connecting arrangement in the folded condition of the easel for releasably retaining its sheet members in such condition.

In another embodiment of the easel, a raised border extends outwardly from the horizontal outer sheet member substantially about the perimeter thereof for forming an enclosure for containing the intermediate and upstanding outer sheet members in the folded condition. The portion of this border arrangement at the free end of the horizontal outer sheet member forms the aforementioned lip member. Thus, in the folded condition of this embodiment of the easel, the upstanding outer and the intermediate sheet members are contained within the border arrangement of the horizontal outer sheet member in the aforedescribed stacked parallel relation and, in the erected condition, the free end of the upstanding outer sheet member is engaged with the lip portion of the border arrangement at the free end of the horizontal outer sheet member. If desirable, the border arrangement may be provided with slots formed correspondingly therein at each side thereof intermediate the ends of the horizontal outer sheet member for receipt of the free end of the upstanding outer sheet member for permitting selective disposition of the upstanding outer sheet member either in the first-mentioned erected condition with the free end thereof in engagement with the lip portion of the border arrangement so that the upstanding outer sheet member is angularly disposed with respect to the horizontal outer sheet member or in a second erected condition with the free end of the outer sheet member in receipt in the slots for more vertical upstanding disposition with respect to the horizontal outer sheet member. The upstanding outer sheet member may be further provided with side portions pivotably affixed along the sides thereof for folded disposition in parallel contact with the upstanding outer sheet member when in either the folded or the first erected conditions and for selective unfolded disposition to be coplanar with the upstanding outer sheet member in the first and second erected conditions, thereby to provide a greater surface area for use as a photographic slide projection screen or for additional sheet material support.

DESCRIPTION OF THE PREFERRED EMBODIMENT

Figure 1:
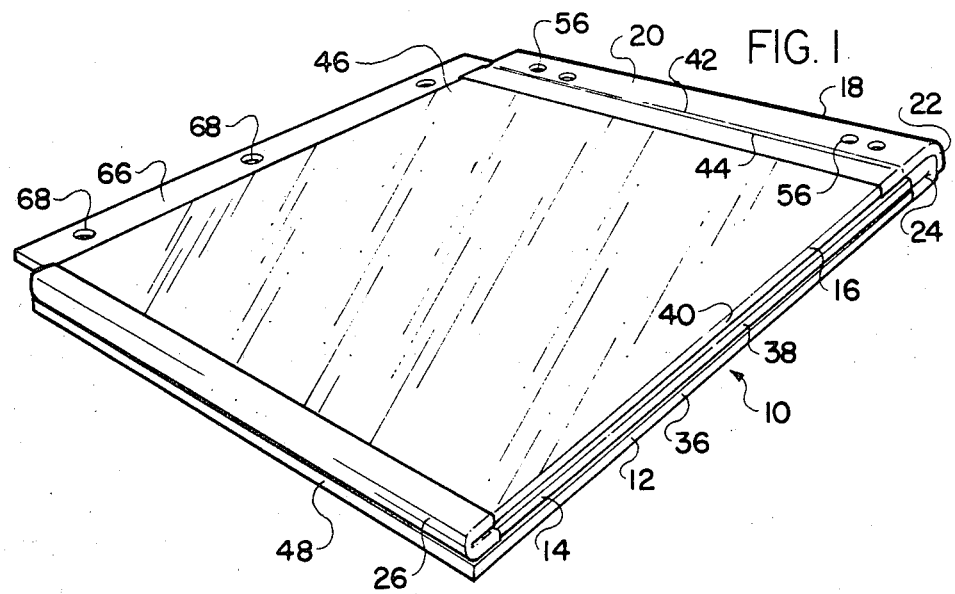
FIGS. 1–3 are perspective views of one embodiment of the easel of the present invention respectively showing it in its folded condition, an intermediate unfolded condition and its erected condition.
Figure 2:
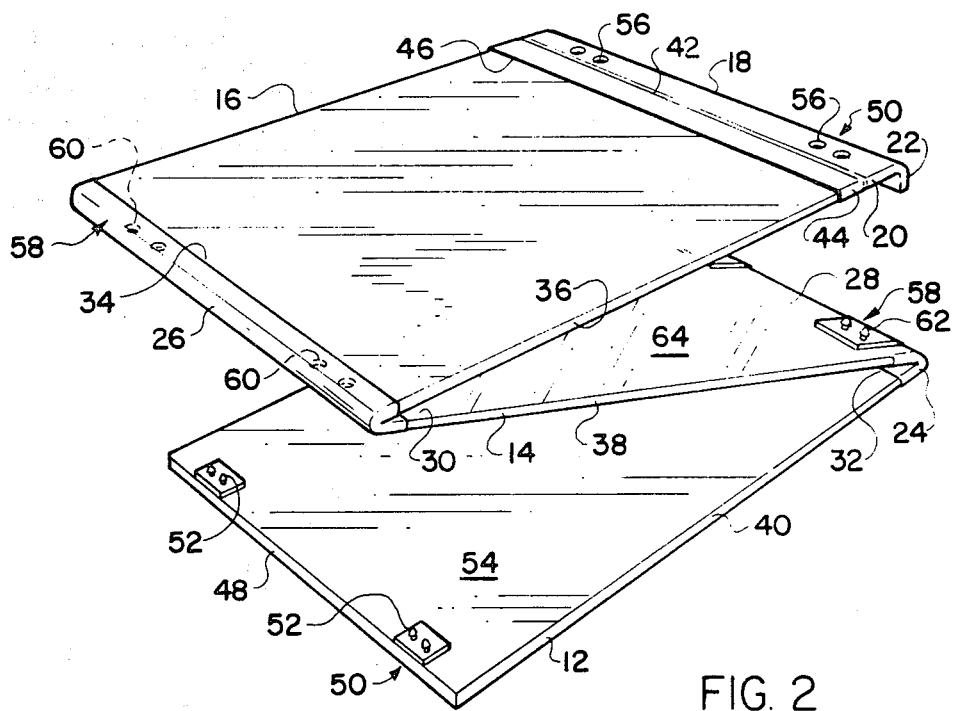
Figure 3:
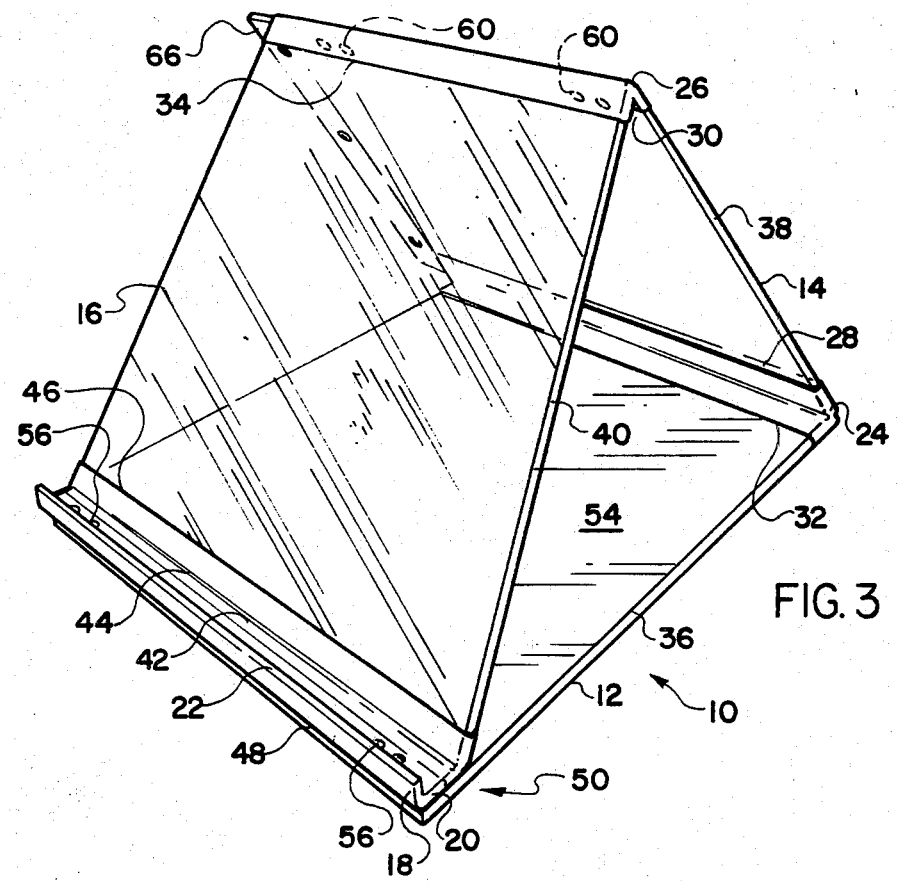

Referring now to the accompanying drawings and initially to FIGS. 1-3, one embodiment of an easel according to the present invention is indicated generally at 10 in a folded condition in FIG. 1, in an erected operative condition in FIG. 3, and in an intermediate condition in FIG. 2 through which the easel 10 passes in movement between its folded and erected conditions.

The easel 10 basically includes a base sheet member 12, an intermediate sheet member 14, and an outer sheet member 16. The sheet members 12,14,16 are planar and rectangular in shape and of generally the same dimensions. The sheet members 12,14,16 are preferably formed of a relatively rigid plastic or similar material. An L-shaped lip member 18 is also provided, the lip member 18 having a main leg 20 and a secondary leg 22 which extends perpendicularly from the main leg 20.

The base and intermediate sheet members 12,14 are of the same lengthwise dimension, but the outer sheet member is shorter in lengthwise dimension by the lengthwise dimension of the main leg 20 of the lip member 18. The base and outer sheet members 12,16 are of the same widthwise dimension, but the intermediate sheet member 14 is of a slightly greater widthwise dimension. The lip member 18 is of the same width as the base and outer sheet members 12,16. Preferably, the sheet members 14,16,18 are of approximately the dimensions of standard-sized letter paper, i.e. 8½×11". Specifically, the intermediate sheet member 14 is 8½"×11", the base sheet member is 8"×11", and the outer sheet member is 8"×10½". The lip member 18 is 8" wide×½" long. However, the sheet members 12,14,16 may also be constructed to other standard paper dimensions. For example, the intermediate sheet member 14 may be 5½"×8½", the base sheet member may be 5"×8½" and the outer sheet member may be 5"×8", with the lip member being 5"×½". Similarly, the sheet members 12,14,16 may be constructed to approximately the dimensions of legal-sized paper.

Flexible hinges 24,26 pivotably connect the opposite end edges 28,30 of the intermediate sheet member 14 to respected end edges 33,34 of the base and outer sheet members 12,16, with respective side edges 36,38,40 of the base, intermediate and outer sheet members 12,14,16 in alignment with one another. The end edge 42 of the main leg 20 of the lip member 18 is similarly connected pivotably by a flexible hinge 44 to the free end edge of the outer sheet member 16. The flexible hinges 24,26,44 are formed of any suitable fabric, plastic or other pliable material which may be permanently adhered or otherwise affixed to the sheets 12,14,16. Alternatively, in embodiments wherein the plastic or other material from which the sheets 12,14,16 provides a reasonable degree of resiliency, the hinges 24,26,28 may be formed unitarily with the sheets 12,14,16 of the same material thereas with score lines or transverse lines of areas of reduced thickness being formed to define the hinges 24,26,28.

The base, intermediate and outer sheet members 12,14,16 will thus be understood to be pivotably movable between the folded condition illustrated in FIG. 1 and the erected condition illustrated in FIG. 3. Specifically, the sheet members 12,14,16 may be folded to the condition of FIG. 1 wherein the sheet members 12,14,16 are oriented in a generally Z-type fashion in substantially stacked parallel relation with one another with the base and outer sheet members 12,16 at opposite sides of the intermediate sheet member 14. The main leg 20 of the lip member 18 extends coplanarly with the outer sheet member 16 in such folded condition, with the secondary leg 22 of the lip member 18 extending over the adjacent ends 32,28 of the base and intermediate sheet members 12,14 at the connecting hinge 24 therebetween. As shown in FIG. 2, the easel 10 is unfolded from the folded condition of FIG. 1 manually by elevation of the intermediate sheet member 14 into an acute angular relation with the base member 12, and pivoting of the outer sheet member 16 about the hinge 26 between its end 34 and the end 30 of the intermediate sheet member 14. Such pivoting of the outer sheet member 16 continues through an obtuse angular range to position its free end 46 at the free end 48 of the base sheet member 12 to orient the base, intermediate and outer sheet members 12,14,16 in triangular relation. The lip member 18 is pivoted about the hinge 44 between its edge 42 and the free end 46 of the outer sheet member 16 to cause the main leg 20 of the lip member 18 to lie in parallel relation in surface contact with the free end 48 of the base sheet member 12. In such disposition of the lip member 18, the secondary leg 22 thereof extends perpendicularly outwardly away from the base sheet member 12, all as shown in FIG. 3.

A connecting arrangement, generally indicated at 50 is provided on the main leg 20 of the lip member 18 at the free end 46 of the outer sheet member 16 and on the free end 48 of the base sheet member 12 for connecting and retaining releasably the base, intermediate and outer sheet members 12,14,16 in their above-described erected condition. The connecting arrangement 50 includes a plurality of pins 52 which are affixed to the surface 54 of the base sheet member 12 which faces the intermediate and outer sheet members 14,16 in their folded condition and extend perpendicularly outwardly from such surface 54 adjacently along the free end edge 48 of the base sheet member 12. A corresponding plurality of mating holes 56 are formed through the main leg 20 of the lip member 18 across the width thereof for snugly receiving the pins 52 on the base member 12 in the aforedescribed erected condition of the easel 10. The connection between the pins 52 and the holes 56 may be readily separated manually when it is desired to pivot the easel 10 into its folded condition.

Another connecting arrangement, indicated generally at 58, is provided at the respective ends 28,30 of the intermediate sheet member 14 to be cooperative and compatible with the connecting arrangement 50 in the folded condition of the easel 10 for connecting and retaining releasably the base, intermediate and outer sheet members 12,14,16 in the aforedescribed folded condition. The connecting arrangement 58 includes a plurality of holes 60 formed through the intermediate sheet member 14 adjacently along its end 30 in correspondence to the locations and spacings of the pins 52 at the free end 48 of the base sheet member 12. Another plurality of pins 62 are affixed to the surface 64 of the intermediate sheet member 14 which faces the outer sheet member 16 in the folded condition of the easel 10 and extend perpendicularly outwardly of such surface 64 adjacently along the end 28 of the intermediate sheet member 14 at locations and spacings corresponding to the holes 56 in the main leg 20 of the lip member 18. Thus, in the folded condition of the easel 10, the holes 60 snugly receive the pins 52 and the pins 62 fit snugly in the holes 56 to connect and retain the base, intermediate and outer sheet members 12,14,16 in their folded condition, such connections being readily separable manually when it is desired to pivot the sheet members 12,14,16 into their erected condition.

Preferably, the greater width of the intermediate sheet member 14 than the base and outer sheet members 12,16 provides a portion 66 of the intermediate sheet member 14 which extends sidewise beyond the base and outer sheet members 12,16 in the folded condition of the easel 10. A plurality of openings 68 are formed at spacings along the extension portion 66 of the intermediate sheet member 14 to facilitate ready receipt of the easel 10 in a conventional ringed binder, notebook or the like when in the described folded condition.

The use and advantages of the easel 10 will thus be understood. In use, the easel 10 is unfolded in the described manner into its erected condition and secured therein by the connecting arrangement 50 by engagement of the pins 52 in the holes 56. In such erected condition, the easel 10 may then be operatively disposed on a desk top or other similar substantially horizontal surface by positioning of the base sheet member 12 on such surface. In such disposition, the intermediate and outer sheet members 14,16 extend angularly from opposite ends thereof in upstanding converging relationship. The main leg 20 of the lip member 18 is thusly disposed outwardly adjacent the upstandingly inclined outer sheet member 16 for supporting and retaining with the secondary leg 22 books, film and other sheet material and the like against the upstanding outer sheet member 16 for reading thereof and the like. In such disposition, the easel 10 provides all of the normal functions and advantages of conventional easels in supporting and displaying such sheet material. Furthermore, in substantial contrast to conventional easels, the easel 10 may be folded in the manner described into a compact flat condition which may be easily and readily stored and/or transported in the same manner as the sheet material for which the easel 10 is utilized. Additionally, the easel 10 may be readily stored and carried in a conventional ringed binder for even greater convenience.

Figure 4:
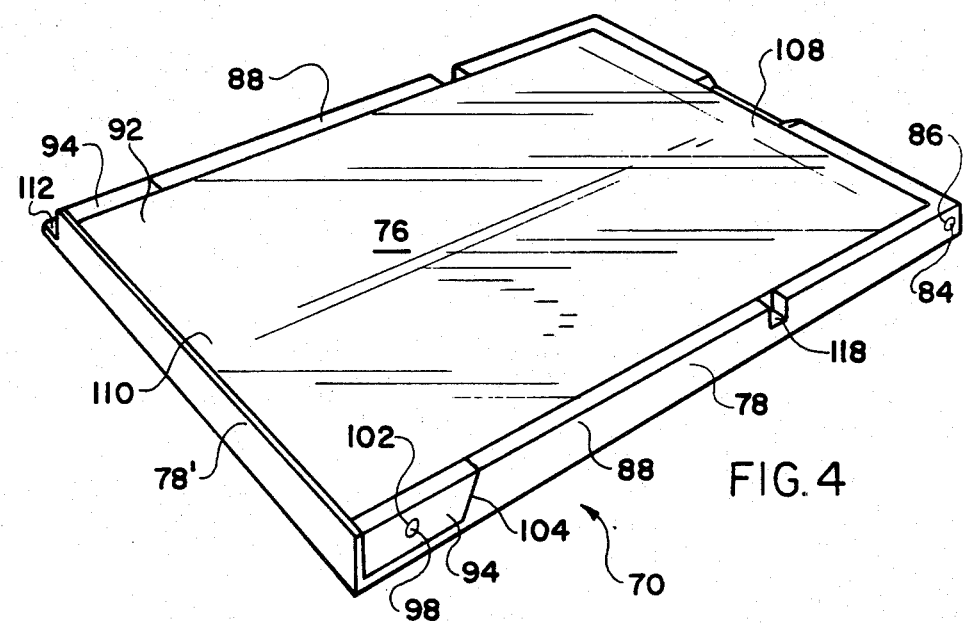
FIGS. 4–7 are corresponding perspective views of another embodiment of the easel of the present invention respectively showing it in its folded condition, an intermediate unfolded condition, and two different erected conditions.
Figure 5:
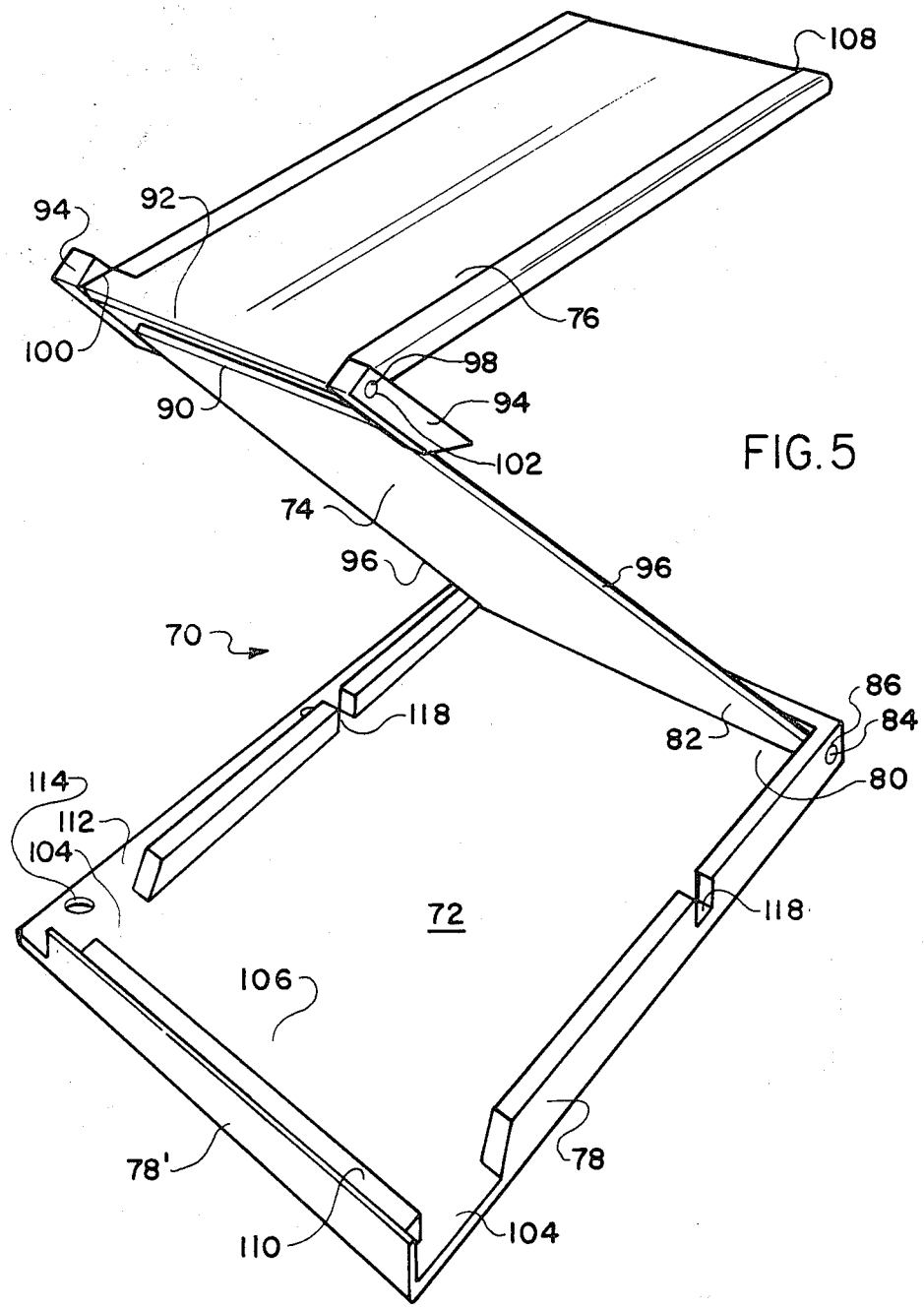
Figure 6:
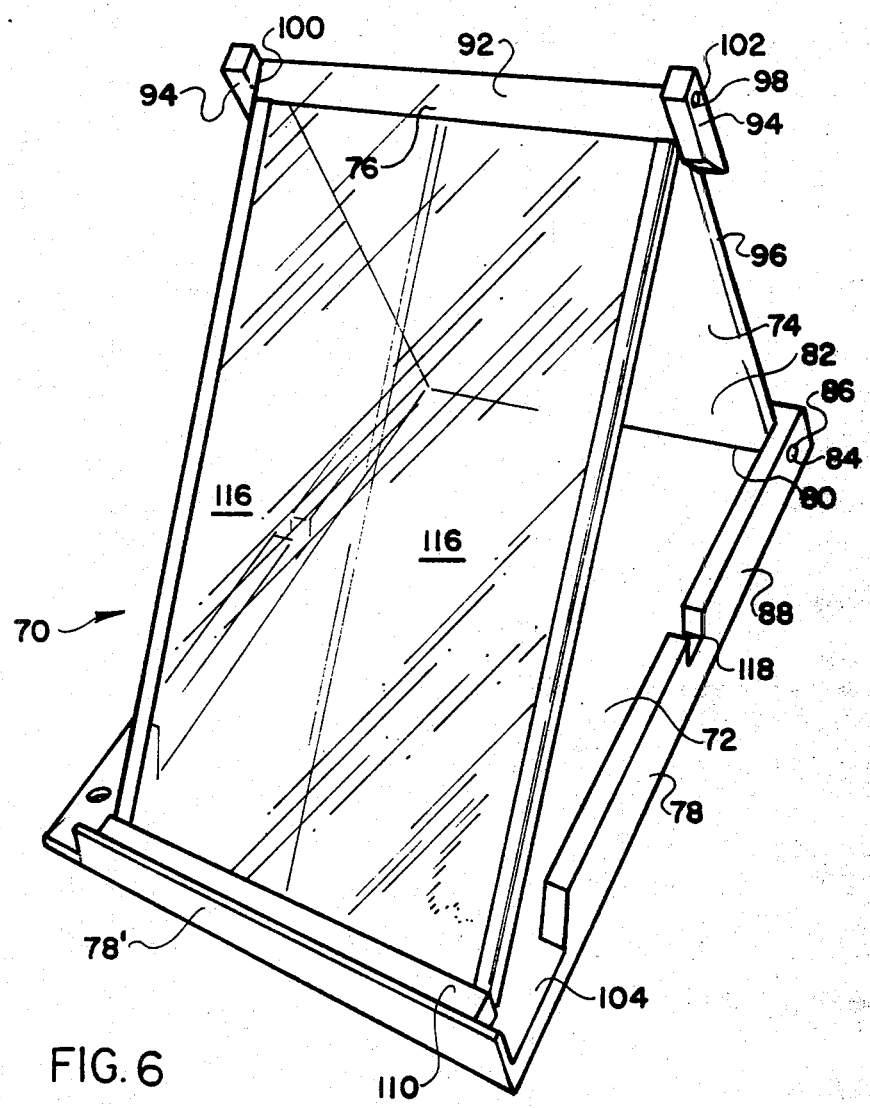
Figure 7:
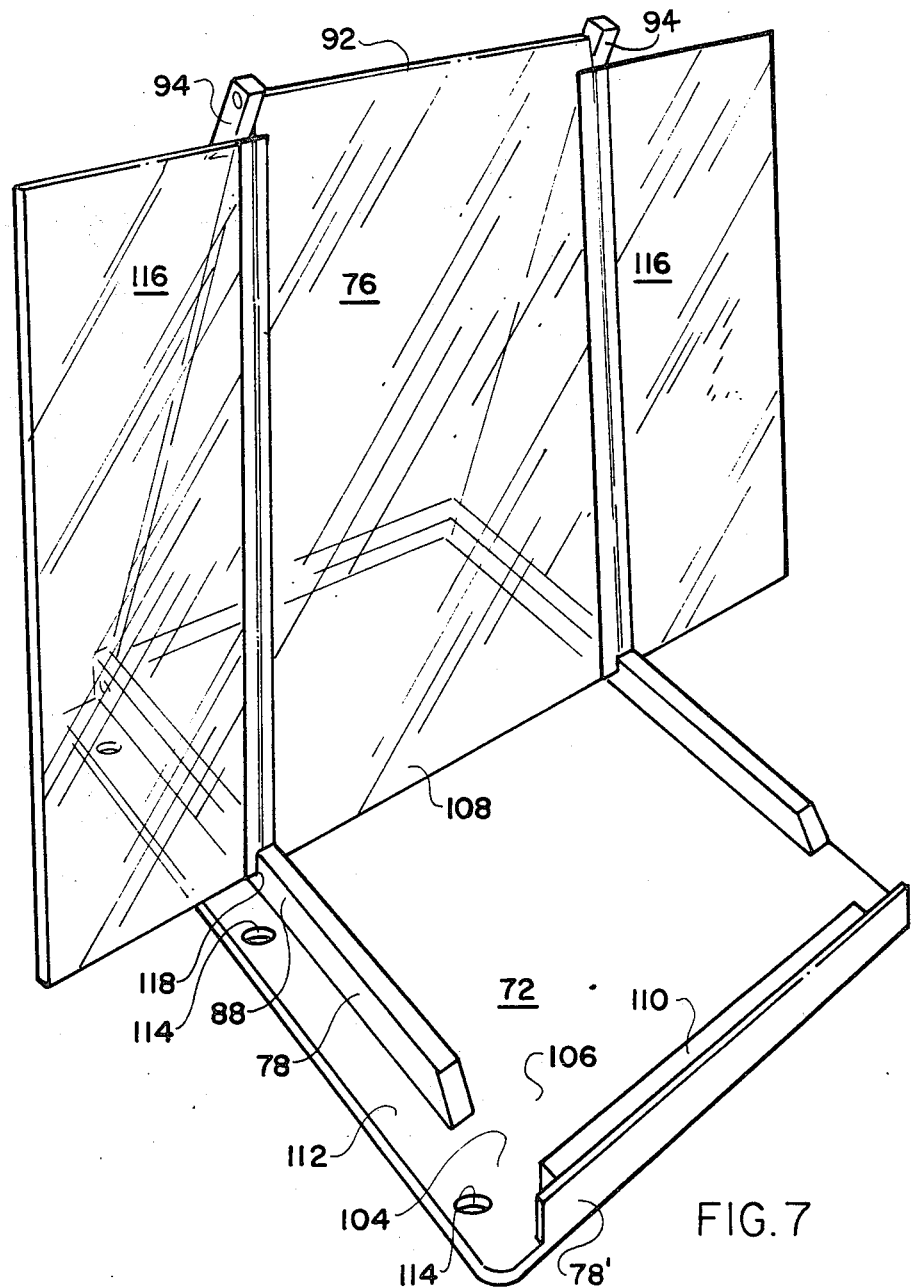

FIGS. 4–7 illustrate a second embodiment of an easel according to the present invention, indicated therein generally at 70. As with the easel 10, the easel 70 is foldably constructed for selective disposition in a folded condition, as shown in FIG. 4, or erected conditions, as shown in FIGS. 6 and 7. The easel 70 also includes planar, rectangular base, intermediate and outer sheet members 72,74,76 of rigid plastic material. The sheet members 72,74,76 are preferably constructed to approximately the dimensions of standard 8½"×11" letter sized paper, as with the easel 10, the intermediate and outer sheet members 74,76 being of substantially the same dimensions as one another but the base sheet member 72 being of greater widthwise and lengthwise dimensions. A raised border 78 is formed about substantially the entire perimeter of the base sheet member 72 and forms an enclosure therewithin substantially the dimensions of the intermediate and outer sheet member 74,76 for containing them in stacked relation with the base sheet member 72. The portion 78' of the border 78 at the free end of the base sheet member 72 forms a stepped lip member 110.

The base sheet member 72 is pivotably connected at one end 80 thereof to an end 82 of the intermediate sheet member 74 by hinge pins 84 affixed to extend perpendicularly outwardly from the sides of the intermediate sheet member 74 at its end 82 and are received in openings 86 in the side portions 88 of the border 78. The other end 90 of the intermediate sheet member 74 is similarly connected pivotably with the end 92 of the outer sheet member 76 by pivot blocks 94 affixed to the respective sides 96 of the intermediate sheet member 74 at its end 90 which blocks 94 have holes 102 which rotatably receive hinge pins 98 extending perpendicularly outwardly from the sides 100 of the outer sheet member 76 at its end 92.

The easel 70 will thus be understood to be pivotably movable between the folded condition of FIG. 4 and the erected condition of FIG. 6. The easel 70 may be folded to the condition of FIG. 4 with the base, intermediate and outer sheet member 72,74,76 oriented in a Z-type fashion in stacked parallel relation by pivoting of the intermediate sheet member 74 into the enclosure 79 defined by the border 78 of the base sheet member 72 to be in overlying parallel relation with the base sheet member 72 and by similarly pivoting the outer sheet member 76 into the enclosure 79 to overlie the intermediate sheet member 74 in parallel stacked relation with it and the base sheet member 72. The border 78 has openings 104 cut therefrom in the sides 88 thereof adjacent the free end 106 of the base sheet member 72 which matingly receive the blocks 94 affixed to the intermediate sheet member 74 in the described folded condition of the easel 70. The easel 70 is unfolded by elevation of the intermediate sheet member 74 from the base sheet member 72 into acute angular relation therewith, as shown in FIG. 5, and pivoting of the outer sheet member about the intermediate sheet member 74 to position the free end 108 of the outer sheet member 76 in engagement against the inwardly facing side of the lip member 110 of the border portion 78' along the free end 106 of the base sheet member 72 to orient and retain the sheet member 72,74,76 in the erected condition of FIG. 6 in triangular relation with one another.

An extension portion 112 extends outwardly from the border 78 along one side 96 thereof in coplanar relation with the base sheet member 72 and is provided with plural openings 114 spaced along the length of the extension 112 to facilitate receipt of the easel 70 in a conventional ringed binder when in its folded condition.

The use and advantages of the easel 70 will thus be understood to correspond to that discussed above with regard to the easel 10. In its erected condition, the easel 70 may be supported by its base sheet member 72 on any suitable substantially horizontal surface for disposition of the outer sheet member 76 at an upstanding incline wherein the portion 78' of the border 78 engaging the free end 108 of the outer sheet member 76 acts as a lip to support sheet material for resting against the outer sheet member 76 thereby to display the sheet material for reading or the like as with most conventional easels. Alternatively, the easel 70 may be folded into its condition shown in FIG. 4 for easy compact storage and transportability, e.g. in a rigid binder or notebook.

As desired, the outer sheet member 76 may be provided with planar side portions 116 pivotably affixed along its side edges 100 for selective movement between a folded disposition in parallel contact with the outer sheet member 76 as shown in FIGS. 4–6 and an unfolded disposition coplanar with the outer sheet member as shown in FIG. 7. The easel 70 may also be provided with slots 118 formed in the sides 88 of the border 78 at corresponding locations intermediately of the ends 80,106 of the base sheet member 72 for receiving the side portions 116 when unfolded so as to permit selective disposition of the outer sheet member 76 and the side portions 116 in a substantially vertical disposition perpendicularly to the base sheet member 72, as shown in FIG. 7. The greater surface area and the vertical orientation of the outer sheet member 76 which may thusly be provided enables the easel 70 to be used with the outer sheet member 76 and the side portions 116 as a viewing screen against which 35 mm. slides and similar photographic or other images may be projected. As will also be understood, it would similarly be possible to pivot the side portions 116 outwardly into their coplanar orientation with the outer sheet member 76 when in the erected condition of FIG. 6 to provide greater surface area for sheet material support. Additionally, the side portions 116 may be used to permanently carry reference information, printed instructions, and the like which may be of aid to the user. For example, the side portions could have printed or affixed thereto standard computer commands, user responses and the like if the easel 70 is to be used by computer operators.

The present invention has been described in detail above for purposes of illustration only and is not intended to be limited by this description or otherwise to exclude any variation or equivalent arrangement that would be apparent from or reasonably suggested by the foregoing disclosure to the skill of the art.

I claim:

1. A foldable easel for selective use in supporting books, sheet material and the like, comprising a planar base sheet member, a planar intermediate sheet member, a planar outer sheet member, an L-shaped lip member, hinge means pivotably connecting opposite ends of said intermediate sheet member to respective ends of said base sheet member and said outer sheet member and pivotably connecting one end of said lip member to the free end of said outer sheet member for selective pivotal movement between a folded condition wherein said base, intermediate and outer sheet members are disposed in a Z-shaped orientation in stacked parallel relation with said base and outer sheet members at opposite sides of said intermediate sheet member, with said one end of said lip member extending generally coplanarly with said outer sheet member, and with the other end of said lip member extending generally transversely to said outer sheet member and adjacent to said hinge means between said intermediate sheet member and said base sheet member, and an erected condition wherein said base, intermediate and outer sheet members are oriented in triangular relation to one another with the free ends of said base and outer sheet members adjacent one another with said one end of said lip member lying on and in parallel relation with said base sheet member and the other end of said lip member extending away therefrom for operative disposition with said base sheet member horizontal and said outer and intermediate sheet members upstanding convergingly therefrom for supporting and retaining sheet material on said lip member and against said outer sheet member, first mating connecting means at said one end of said lip member and said free end of said base sheet member for releasably holding said lip member and said base sheet member together in said erected condition, and second mating connecting means at each end of said intermediate sheet member cooperative with said first connecting means for releasably holding said base, intermediate and outer sheet members and said lip member together in said folded condition.

2. A foldable easel according to claim 1 and characterized further in that said base, intermediate and outer sheet members are rectangular in shape and are formed of a rigid plastic material.

3. A foldable easel according to claim 1 and characterized further in that said first connecting means includes a plurality of openings formed in one of said lip member and said base sheet member and a plurality of pins matingly formed on the other thereof for receipt in said openings in said erected condition.

4. A foldable easel according to claim 3 and characterized further in that said second connecting means includes a plurality of openings formed in one end of said intermediate sheet member for receipt of said pins of said first connecting means in said folded condition and a plurality of pins formed in the other end of said intermediate sheet member for receipt in said openings of said first connecting means in said folded condition.

5. A foldable easel according to claim 1 and characterized further in that at least one of said intermediate and outer sheet members has plural openings formed therein for receipt in a ringed binder.

6. A foldable easel according to claim 5 and characterized further in that one of said intermediate and outer sheet members has an extension portion along one side edge thereof, said plural openings being formed in said extension portion.

7. A foldable easel for selective use in supporting books, sheet material and the like, comprising a planar base sheet member, a planar intermediate sheet member, a planar outer sheet member, border means extending outwardly from said base sheet member substantially about the perimeter thereof for forming an enclosure for containing said intermediate and outer sheet members in stacked relation with said base sheet member, and hinge means pivotably connecting opposite ends of said intermediate sheet member to respective ends of said base sheet member and said outer sheet member for selective pivotal movement between a folded condition wherein said base, intermediate and outer sheet members are disposed is a Z-shaped orientation in stacked parallel relation with said intermediate and outer sheet members contained within said border means of said base sheet member and with said base and outer sheet members at opposite sides of said intermediate sheet member and an erected condition wherein said base, intermediate and outer sheet members are oriented in triangular relation to one another with the free end of said outer sheet member engaged with said border means at the free end of said base sheet member for operative disposition with said base sheet member horizontal and said outer and intermediate sheet members upstanding convergingly therefrom for supporting and retaining sheet material on said border means at said free end of said base sheet member and against said outer sheet member.

8. A foldable easel according to claim 7 and characterized further in that said border means includes slot means formed correspondingly therein at each side thereof intermediate the ends of said horizontal outer sheet member for receipt of the free end of said upstanding outer sheet member for selective disposition thereof either in said first-mentioned erected condition with said free end of said outer sheet member in engagement with said border means for upstanding disposition angularly with respect to said horizontal outer sheet member or in a second erected condition with said free end of said outer sheet member in receipt in said slot means for upstanding disposition more vertically with respect to said horizontal outer sheet member.

9. A foldable easel according to claim 8 and characterized further in that said upstanding outer sheet member includes side portions pivotably affixed along the sides thereof for folded disposition in parallel contact with said upstanding outer sheet member in said folded and first erected conditions and for selective unfolded disposition to be coplanar with said upstanding outer sheet member in either said first or second erected condition.

* * * * *

UNITED STATES PATENT OFFICE
CERTIFICATE OF CORRECTION

Patent No. 4,544,123          Dated   October 1, 1985

Inventor(s)      Peter R. Peacock

It is certified that error appears in the above-identified patent and that said Letters Patent are hereby corrected as shown below:

Column 3, Line 44, delete "33" and insert therefor -- 32 -- .

Column 6, Line 56, delete "rigid" and insert therefor -- ringed -- .

Column 8, Line 40, delete "is" and insert therefor -- in -- .

Signed and Sealed this

Fifteenth Day of April 1986

[SEAL]

Attest:

DONALD J. QUIGG

Attesting Officer         Commissioner of Patents and Trademarks